United States Patent
Appelgren

[11] Patent Number: 5,447,214
[45] Date of Patent: Sep. 5, 1995

[54] HYDRAULIC BRAKE SYSTEM BLEED VALVE AND METHOD FOR BLEEDING AIR

[76] Inventor: Dallas A. Appelgren, Box 88, Hillman, Mich. 49746

[21] Appl. No.: 276,900

[22] Filed: Jul. 19, 1994

[51] Int. Cl.[6] .............................................. F16K 31/44
[52] U.S. Cl. ..................................... 188/352; 251/216
[58] Field of Search ................ 188/352; 251/216, 217, 251/351, 347, 348, 354; 137/614.17

[56] References Cited

U.S. PATENT DOCUMENTS

| | | | |
|---|---|---|---|
| 660,128 | 10/1900 | Sowle | 251/216 |
| 2,892,614 | 6/1959 | Majneri | 188/352 |
| 3,578,285 | 5/1971 | Carlton | 251/218 |
| 3,727,638 | 4/1973 | Zaremba, Jr. et al. | 188/352 |
| 4,470,577 | 9/1984 | Warwick | 188/352 |
| 4,474,272 | 10/1984 | Omlie | 188/352 |
| 4,834,140 | 5/1989 | Schmidt | 137/614.17 |

*Primary Examiner*—Matthew C. Graham
*Attorney, Agent, or Firm*—Learman & McCulloch

[57] ABSTRACT

An air bleed valve (40) includes a valve base (42), a valve cap (44) and an O-ring seal (46). The valve base (42) includes an inner threaded portion (58) that screws into a threaded bore (12) in the wall (14) of a linear actuator (16) and an inner end conical sealing surface (54) that is in sealing contact with a valve seat (18) in the linear actuator. A bleed air passage (48) through the valve base (42) is in communication with the linear actuator through a smooth walled bore (20). A valve cap (44) screws onto the outer threaded portion (64) of the valve base (42). When the air bleed valve (40) is closed, the conical cap valve surface (72) closes the bleed air passage (48). An O-ring seal (46) seals off the threaded section (68) and the outer threaded portion (64) from the invasion of corrosive materials. To open the valve (40) the valve cap (44) is rotated relative to the valve base (42) to separate the conical cap valve surface (72) from the conical base valve seat (74) and form a discharge chamber (88) which conveys air from the bleed air passage (48) to the discharge passage (76).

17 Claims, 2 Drawing Sheets

HYDRAULIC BRAKE SYSTEM BLEED VALVE AND METHOD FOR BLEEDING AIR

TECHNICAL FIELD

This invention relates to a bleed valve and, more particularly, to a bleed valve for bleeding air from a vehicle hydraulic brake system wheel cylinder.

BACKGROUND OF THE INVENTION

Hydraulic brake systems used on motor vehicles have one or more master cylinders that direct hydraulic fluid under pressure to linear actuators mounted on vehicle wheel assemblies. Linear actuators expand to apply drum-type brakes or to apply disk-type brakes. The linear actuators contract to release the brakes. In a properly functioning hydraulic brake system, depressing the brake pedal forces hydraulic fluid into linear actuators and expands the actuators. The brake shoes or brake pads of each wheel assembly are forced, by an actuator, into contact with a brake drum or a brake rotor disk. Continued movement of the brake pedal increases the braking force supplied. Substantially full braking force is applied with movement of the brake pedal through a portion of its full stroke in a properly operating system. The hydraulic brake system is able to apply sufficient braking force with a small movement of the brake pedal because the hydraulic brake fluid is incompressible.

Occasionally, air finds it way into a hydraulic brake system. If the master cylinder becomes low on hydraulic brake fluid, for example, air can enter the system through the master cylinder. Air can also enter the system if a line is loosened. The build up of air in a hydraulic brake system can prevent the system from applying the required force on the brakes, due to the compressibility of air. Manual movement of the brake pedal compresses the air in the hydraulic brake system, rather than expanding the linear actuator, and the brake pedal may become fully depressed before sufficient pressure is produced in the system to fully engage the brakes. Air in a hydraulic system may expand, due to an increase in temperature. The pressure generated by the thermal expansion of the air can expand the linear actuator and cause a brake to drag when the brake is not being applied by the vehicle operator. Brake drag generates additional heat, increases the temperature of the air and may eventually result in brake failure.

Linear actuators have been equipped with air bleed valves for removing air from a brake system, since hydraulic brakes were first introduced. These valves allow brake fluid to be pumped through the lines to force air in the lines, and air in the linear actuators, out through an open bleed valve. The air bleed valves, when working properly, purge air from a hydraulic system. Linear actuators for drum-type brakes are mounted on a brake mounting plate attached to an axle housing or a steering knuckle assembly. The bleed valve is exposed on the surface of the brake mounting plate facing the wheel on the opposite side of the vehicle. Linear actuators for disk brakes are part of a caliper supported adjacent to a disk rotor. The wheels on an automotive vehicle normally, at least partially, enclose the linear actuator. The air bleed valves are, however, exposed to spray, dirt, dust and other contaminants from road surfaces in about the dirtiest location on a vehicle and to the inside of the wheels, where they are generally not seen and are not cleaned. Thus, the air bleed valves that are currently in use are susceptible to damage by corrosion. The valves tend to corrode due to contaminants that contact the threads on the brake bleed valve and fill a large chamber adjacent to the valve seat. Manufacturers of motor vehicles have, in recent years, placed a snap-on plastic cap over the discharge passage of air bleed valves. The plastic caps are frequently knocked off and lost. It also appears that the plastic caps allow contaminants to seep into the discharge passage over time. Once contaminants enter the discharge passage, the plastic cap tends to retain them in the discharge passage.

The threads on brake bleed valves are exposed to these corrosive agents on the outside of the linear actuator at a point where the air bleed valve screws into the linear actuator. The threads on air bleed valves are also exposed to thee corrosive agents in a discharge passage inside the linear actuator. Over a period of time, the threads on the air bleed valves and the threads inside the linear actuators that receive the air bleed valves become corroded to the point that it is not possible to turn an air bleed valve and open a discharge passage to allow air to be purged from the system. Corrosion can also damage the valve seats.

Advanced corroding of air bleed valves generally makes it necessary to replace the entire linear actuator. This is clearly an expensive procedure. In some cases, a linear actuator can be removed from a vehicle, the piston or pistons and seals can be removed and then the linear actuator housing can be heated and the air bleed valve removed. The time required to disassemble and remove an air bleed valve that is frozen due to corrosion can be substantial. It may, therefore, be less expensive to replace the old linear actuator with a complete new unit than to remove a frozen brake bleed valve.

The air bleed valve corrosion problem has been recognized for many years. Numerous solutions have been attempted. Air bleed valves have been made from stainless steel, for example. Stainless steel bleed valves are difficult to machine and are expensive. The threads in the linear actuator, which receive the stainless steel air bleed valve, still corrode. Multipart complicated valve arrangements which reduce corrosion problems have been designed. These complicated valves are expensive and are often usable only in linear actuators that are designed to receive them and may not be useable as replacement bleed valves in linear actuators employed on vehicles in use at this time.

SUMMARY OF THE INVENTION

An object of the invention is to provide a replacement brake system air bleed valve for use on currently operated vehicles which provides corrosion protection. Another object of the invention is to provide an air bleed valve that has no discharge chamber that can receive corrosion causing agents when the air bleed valve is closed. A further object of the invention is to provide an air bleed valve with a relatively short discharge passage.

The air bleed valve includes a valve base and a valve cap. The valve base has external threads on one end that are received in a threaded bore in a linear actuator housing. The end of the valve base that projects into the linear actuator housing includes a sealing surface that contacts a valve seat at the base of the threaded bore in the linear actuator housing. A valve inlet passage passes through the center of the valve base. The end of the valve base that extends from a linear actuator has a threaded male portion that is concentric with the valve inlet passage. A valve cap with female threads is received on the threaded male portion of the valve base. The valve cap has a discharge passage with a fluid receiving end that is offset to one side of the valve inlet passage. The air bleed valve cap has a cap valve surface that contacts a corresponding valve seat on the valve base to close the valve inlet passage and cap discharge passage when the valve cap is rotated and advanced to a closed position. An O-ring seal is placed in a groove at the base of the threaded male portion on the end of the valve base that extends from the linear actuator. The O-ring seal contacts the surface of a cylindrical bore inside the valve cap to prevent corrosion of the threads in the valve cap.

The foregoing and other objects, features and advantages of the invention will become apparent in the light of the following detailed description of an exemplary embodiment thereof, as illustrated in the accompanied drawing.

THE DRAWINGS

DETAILED DESCRIPTION OF THE PREFERRED EMBODIMENT

Figure 1:
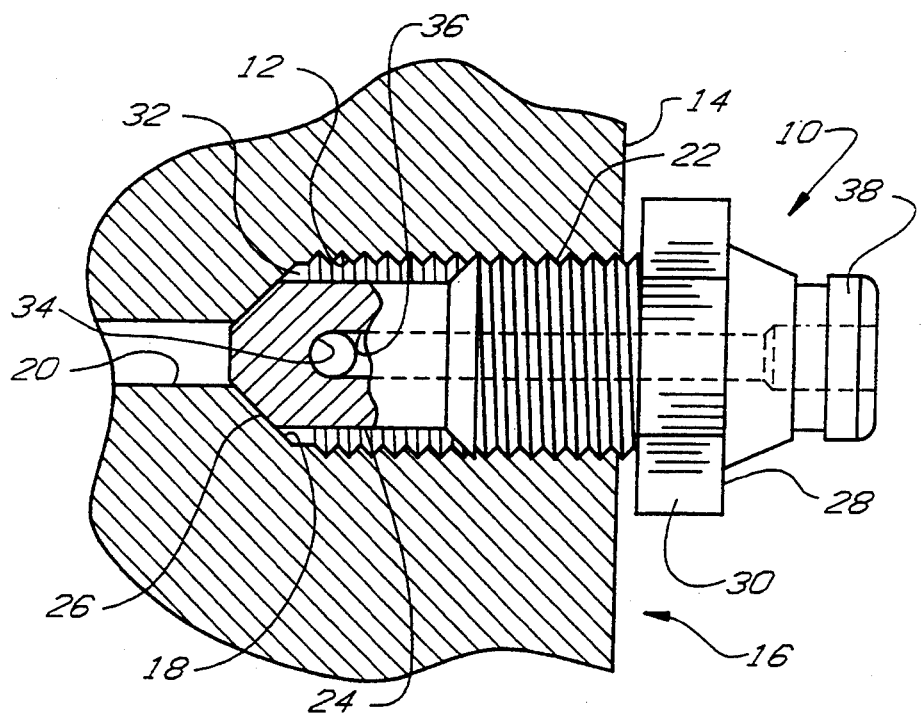
FIG. 1 is a partly sectional elevational view of a prior art brake bleed valve shown mounted on a linear actuator.
Figure 2:
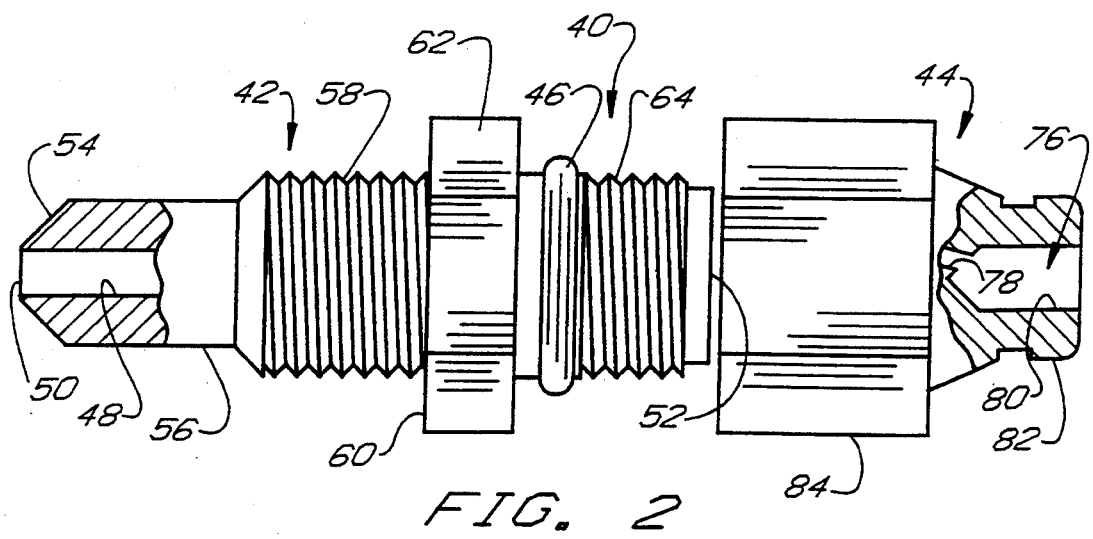
FIG. 2 is an expanded view of the brake bleed valve of the present invention, including a valve base, a brake bleed valve cap and an O-ring seal.

The prior art brake bleed valve 10, shown in FIG. 1, is a one-piece member that screws into a threaded bore 12 in a wall 14 of a linear actuator 16. There is a convergent valve seat 18 at the inner end of the threaded bore 12 and a smooth-walled bore 20 that extends from the valve seat 18 to the inside cylindrical portion (not shown) of the linear actuator 16. The brake bleed valve 10 has a threaded portion 22 that screws into the threaded bore 12 in the linear actuator 16. A cylindrical portion 24 of the brake bleed valve extends axially from the threaded portion 22 of the brake bleed valve 10. The end of the cylindrical portion 24 of the brake bleed valve 10, opposite the threaded portion 22, has a frusto-conical valve surface 26 that contacts the valve seat 18 to prevent the flow of fluid through the smooth-walled bore 20 from the cylinder portion of the linear actuator 16.

A flange 28 on the brake bleed valve 10 has a radially outer hexagonally shaped surface 30. The surface 30 on the flange 28 can be engaged by a tool to screw the brake bleed valve 10 into or out of the threaded bore 12. Screwing the brake bleed valve 10 partially out of the threaded bore 12 to separate the frusto-conical valve surface 26 from the valve seat 18 allows air in the bore 20, when under pressure, to enter the annular discharge chamber 32, pass through the radial passage 34 and then pass through the long discharge passage 36 that joins the radial passage. A flexible tube can be forced over the tubular retainer flange 38 to receive fluid from the long discharge passage 36 and direct the fluid to a holding container for reuse or disposal. The hexagonally shaped surface 30 can be engaged by a tool to rotate the brake bleed valve 10 and screw the brake bleed valve into the threaded bore 12 until the valve surface 26 is in contact with the valve seat 18 and the flow of hydraulic fluid through the smooth-walled bore 20 is blocked.

A closed prior art brake bleed valve 10, as shown in FIG. 1, has threads 22 positioned between the flange 28 and the wall 14 of the linear actuator 16 which are exposed to contaminants such as water and salt. Contaminants can, over time, cause the threads in the threaded bore 12 and the threaded portion 22 of the brake bleed valve 10 to corrode. Contaminants can also enter the annular discharge chamber 32 through the long discharge passage 36. Over a period of time, contaminants in the annular discharge chamber 32 may cause the threads in the bore 12 and the portion 22 of the brake bleed valve 10 adjacent to the annular discharge chamber 32 to corrode. Such corrosion of portions of the threads in the threaded bore 12 and the threaded portion 22 of the brake bleed valve 10, which are in threaded engagement, can lock or freeze the brake bleed valve in the closed position so that it cannot be opened to bleed air from the hydraulic brake system. Contaminants in the annular discharge chamber 32 may also corrode the valve seat 18 and the frusto-conical valve surface 26.

Figure 3:
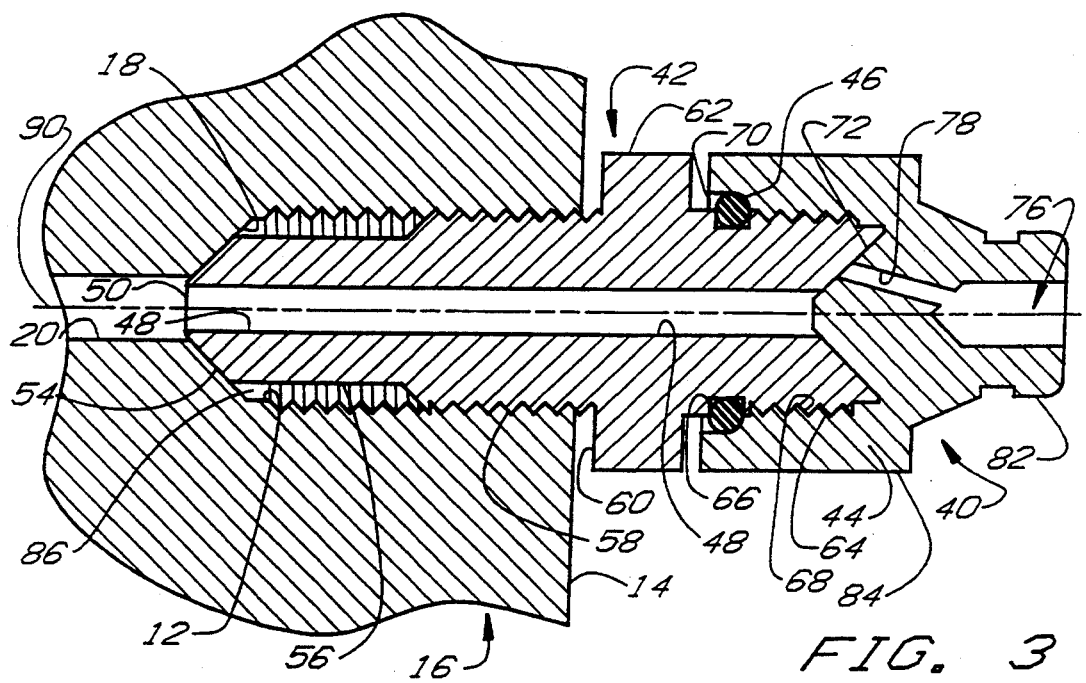
FIG. 3 is a sectional view showing the brake bleed valve of FIG. 2 in its closed position.
Figure 4:
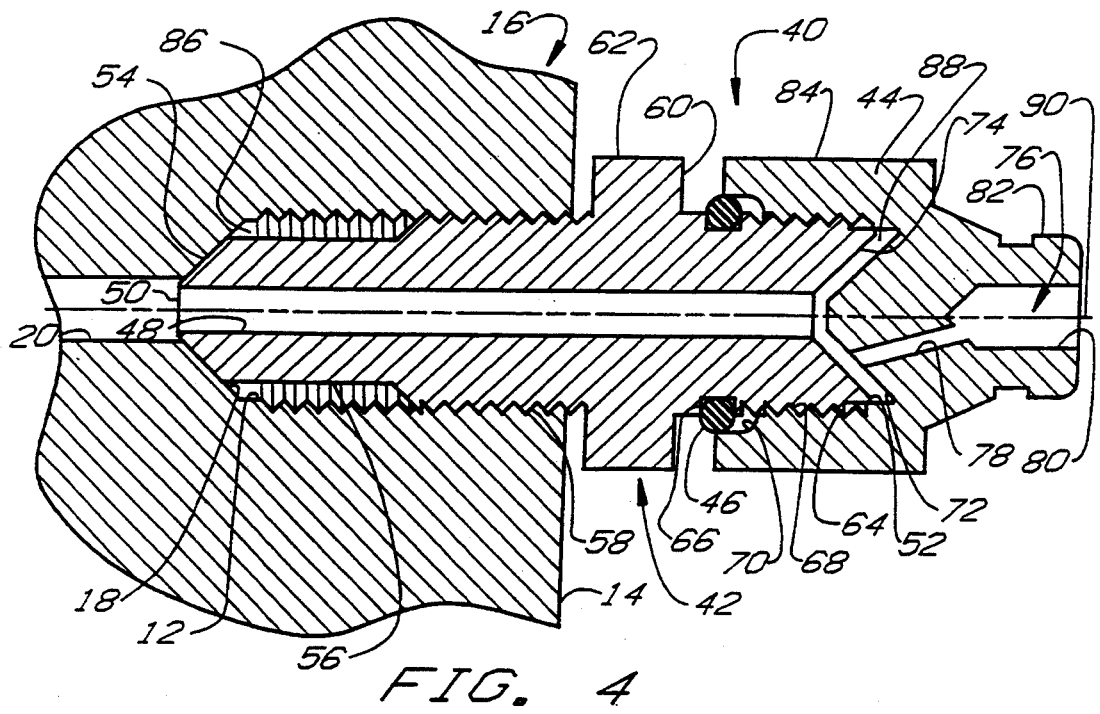
FIG. 4 is a similar sectional view with the valve in an open position.

The brake system air bleed valve 40 of this invention, as shown in FIGS. 3 and 4, includes a valve base generally designated 42, a valve cap generally designated 44 and an O-ring seal generally designated 46 mounted in a linear brake actuator 16. The same numerals used previously to identify parts of the brake actuator 16 will be used in describing the present invention. The valve base 42 includes a bleed air passage 48 and has an inner inlet end 50 and an outer outlet end 52. The inlet end 50 of the valve base 42 has a frusto-conical sealing surface 54, a cylindrical section 56 and an inner threaded portion section 58. A radially extending flange 60 with a hexagon shaped peripheral surface 62 is provided on the central portion of the valve base 42 adjacent to the inner threaded portion 58. The end of the valve base 42, between the outlet end 52 and the radially extending flange 60, includes an outer threaded portion 64 and a seal groove 66. An O-ring seal 46 is mounted in the seal groove 66 between the outer threaded portion 64 and the radially extending flange 60.

The valve cap 44 of the air bleed valve 40 has a bore with a threaded section 68 shown in FIGS. 3 and 4. The threaded section 68 of the valve cap 44 has a cylindrical sealing surface 70 at one end and a convergent cap valve surface 72 at the other end. The cap valve surface 72 engages the valve seat 74 in the outlet end 52 of the valve base 42 to close the bleed air passage 48. A discharge passage 76 in the cap 44 includes a short inner reduced diameter passage 78 and an outer enlarged diameter passage 80. The enlarged diameter passage 80 is concentric with the central axis 90 of the cap 44 and axially aligns with the bleed fluid and air passage 48. The inner reduced diameter passage 78 in the valve cap 44 is radially spaced to one side of the central axis 90 center line and at an acute angle to the central axis. A tube retention flange 82 is provided for connecting a flexible tube to the valve cap 44 to receive hydraulic brake fluid and air and direct the hydraulic brake fluid to a holding container for environmental purposes while bleeding air from a hydraulic brake system. A hexagonally-shaped surface 84, as provided on the valve cap 44, can be engaged by a tool to rotate the valve cap.

The valve base 42 of the air bleed valve 40 is inserted into the threaded bore 12 of a linear actuator 16 and rotated to engage the inner threaded portion 58 with the threads in the threaded bore 12. A tool is then used to engage the hexagon shaped peripheral surface 62 and rotate the valve base 42 until the conical sealing surface 54 is in sealing contact with the valve seat 18 at the inner end of the threaded bore 12. The valve base 42 is rotated until it is tight and securely held in the threaded bore 12. The valve base 42 is screwed into the same threaded bore 12 that the prior art bleed valve 10 screws into. The bleed air passage 48 in the valve base 42 is in communication with the smooth walled bore 20 in the linear actuator 16. The annular chamber 86, between the cylindrical section 56 of the valve base 42 and the threaded bore 12 and extending from the valve seat 18 to the inner threaded portion 58 on the valve base, is completely enclosed, as shown in FIGS. 3 and 4. Contaminants that could cause corrosion will not normally enter the annular chamber 86. The inner threaded portion 58 between the wall 14 of the linear actuator 16 and the flange 60 of the valve base 42 is exposed to contaminants that can cause corrosion. However, corrosion between the inner threaded portion 58 and threads in the threaded bore 12 is not a serious problem because the valve base 42 does not have to be turned and loosened in order to bleed air through the smooth walled bore 20. The conical sealing surface 54 remains in contact with the valve seat 18 during bleeding, as shown in FIG. 4. The threads in the threaded section 68 of the valve cap 44 engage the threads on the outer threaded portion 64 of the valve base 42. Rotation of the valve cap 44 in one direction will move the cap valve surface 72 into sealing contact with the conical valve seat 74 on the valve base 42 and will close the air bleed valve 40, as shown in FIG. 3. When the air bleed valve 40 is closed, the bleed passage 48 is closed, and the passage 78 in the valve cap 44 is closed. The O-ring seal 46 in the seal groove 66 is in sealing contact with the cylindrical sealing surface 70. Thus the threads of the threaded section 68 that are in contact with the threads of the outer threaded portion 64 are protected at both ends from materials that could cause corrosion when the air bleed valve 40 is closed.

Hydraulic brake fluid and air can be bled from the linear actuator 16 by rotating the valve cap 44 to separate the cap valve surface 72 from the conical valve seat 74 and open the air bleed valve 40. When the air bleed valve 40 is open, the bleed air passage 48 and the discharge passage 76 on the valve cap 44 are both open. A discharge chamber 88 is formed between the conical valve seat 74 and the cap valve surface 72. The discharge chamber 88 provides a flow path connecting the passage 48 with the discharge passage 76 in the valve cap 44. When the air bleed valve 40 is open, as shown in FIG. 4, the O-ring seal 46 is still in sealing contact with the cylindrical sealing surface 70.

Rotation of the valve cap 44 to close the air bleed valve 40 moves the conical valve surface 72 into contact with the conical base valve seat 74 in the valve base 42. The two conical surfaces are self-centering and close the passage 48 and the discharge passage 76. When the air bleed valve 40 is closed, the discharge chamber 88, between the cap valve surface 72 and the conical base valve seat 74 disappears. Elimination of the discharge chamber 88 eliminates a holding area for contaminants which cause corrosion. In the event that the reduced diameter passage 78 becomes plugged, the valve cap 44 can be removed from the valve base 42, and the reduced diameter passage can be cleaned.

The base valve seat 74 in the valve base 42 takes the form of a frusto-conical recess in the outlet end 52 of the valve base, as shown in FIGS. 3 and 4, and the cap valve surface 72 in the valve cap 44 is a truncated conical projection. If desired, the conical projection could be on the valve base 42 and the frusto-conical recess could be on the valve cap 44.

The valve base 42 and the valve cap 44 of the air bleed valve 40 have a common central axis 90 as shown in FIGS. 3 and 4. If desired the valve base 42 could have a bend between the inlet end 50 and the outlet end 52 to make it more convenient for a mechanic to open and close the air bleed valve 40.

Air is bled from a hydraulic brake system by rotating the valve cap 44 relative to the valve base to form a discharge chamber 88 and connect the bleed air passage 48 to the discharge passage 76. The brake pedal is then depressed to pump hydraulic fluid from the master cylinder through brake lines and into the linear actuator 16. Brake fluid entering the linear actuator 16 forces air in the linear actuator out through the bleed air passage 48, the discharge chamber 88 and the discharge passage 76. The brake pedal is held to the floor upon reaching the bottom of its stroke and the valve cap 44 is rotated to close the bleed air passage 48, close the discharge passage 76 and eliminate the discharge chamber 88. The brake pedal is then allowed to return to its starting position. The air bleed valve 40 is closed during return movement of the brake pedal to insure that air is not drawn into the linear actuator 16 during return movement of the brake pedal. If air remains in the hydraulic brake system, the valve cap 44 is again rotated to its open position and the air bleed procedure described above is repeated. Repetition of the air bleeding procedure continues until the air is purged. Air is usually purged when brake fluid is discharged through the discharge passage 76. However, if there is air in the brake lines between the master cylinder and the linear actuator 16, it may be necessary to discharge a quantity of brake fluid and air to insure that all the air is discharged.

It is to be understood that the embodiments described are exemplary of various forms of the invention only and that the invention is defined in the appended claims which contemplate various modifications within the spirit and scope of the invention.

I claim:

1. A method for bleeding air from a hydraulic brake system linear actuator through an air bleed valve having a valve base with an inlet end, an outlet end and a base valve seat on the outlet end, a bleed air passage through the valve base in communication with fluid in said linear actuator, said valve base having an outer threaded portion, a valve cap having a bore with a threaded section in threaded engagement with the outer threaded portion of said valve base, a cap valve surface on said valve cap, and a discharge passage through said valve cap in communication with said cap valve surface, the method including the steps of a) rotating the valve cap relative to the valve base in a first direction to separate the cap valve surface from the base valve seat to form a discharge chamber defined by the cap valve surface, the base valve seat and a portion of said bore, that connects the air bleed passage to the discharge passage; b) pumping air from the linear actuator through the bleed air passage, through the discharge chamber and on through the discharge passage; and c) rotating said valve cap relative to said valve base to substantially eliminate the discharge chamber, to close the bleed air passage with the cap valve surface, and to close the discharge passage with the base valve seat.

2. A method for bleeding air from a hydraulic brake system linear actuator as set forth in claim 1 further including the step of: sealing between an open end of the bore with a threaded section in said valve cap and said valve base to protect the threaded section of said valve cap and the outer threaded portion of said valve base from corrosive contaminants.

3. A method for bleeding air from a hydraulic brake system linear actuator as set forth in claim 2 wherein said seal protects the threaded section and the outer threaded portion from the invasion of contaminants while air is being bled from the system.

4. A hydraulic brake system including a linear actuator and a brake bleed valve with corrosion protection, comprising a valve base having an inlet end, an outlet end, a bleed air passage extending from the inlet end to the outlet end in fluid communition with said linear actuator, an outer threaded portion on the outlet end, a base valve seat on the outlet end, and an O-ring engaging surface between the outer threaded portion and the inlet end;
a valve cap having a bore with a threaded section in engagement with the outer threaded portion on the outlet end of said valve base, a cap valve surface inside the bore with a threaded section, a discharge passage through the valve cap, and a valve cap sealing surface concentric with the threaded section of the bore in the valve cap;
an O-ring seal in engagement with said valve cap sealing surface and the O-ring engaging surface on said valve base; and
wherein the cap valve surface closes the bleed air passage in said valve base, and the base valve seat on the outlet end of said valve base closes the discharge passage when said valve cap is advanced along the outer threaded portion on the outlet end of said valve base in one direction to a closed position and wherein the cap valve surface separates from the base valve seat on the outlet end of said valve base when said valve cap is advanced along the outer threaded portion on the outlet end of said valve base in a second direction to an open position with a discharge chamber formed between the base valve seat on the outlet end of said valve base and the cap valve surface and wherein the discharge chamber is operable to convey air from the bleed air passage to the discharge passage through said valve cap.

5. A hydraulic brake system, as set forth in claim 4, wherein the base valve seat on the outlet end of said valve base includes a conical surface and the cap valve surface in said valve cap includes a conical surface.

6. A hydraulic brake system as set forth in claim 5, wherein the cap valve surface extends into the base valve seat on the outlet end of said valve base.

7. A hydraulic brake system as set forth in claim 4, wherein the valve cap sealing surface includes a cylindrical surface that engages the outer diameter of the O-ring seal.

8. A hydraulic brake system as set forth in claim 4, wherein said valve base includes an inlet sealing surface on the inlet end of said valve base.

9. A hydraulic brake system as set forth in claim 4, wherein said valve base includes an inner threaded portion and a cylindrical section with a cylindrical surface between the inlet end and the inner threaded portion.

10. A hydraulic brake system as set forth in claim 4, wherein the valve base includes a hexagon shaped peripheral surface between inner threaded portion and the outer threaded portion.

11. A hydraulic brake system as set forth in claim 4, wherein said valve cap includes a radially outward facing hexagonally shaped surface.

12. A hydraulic brake system as set forth in claim 4, wherein the bleed air passage includes a portion that is concentric with the base valve seat the outlet end of said valve base.

13. A hydraulic brake system as set forth in claim 4, wherein the discharge passage in said valve cap includes an inlet that is in communication with the cap valve surface and is offset to one side of the cap valve surface.

14. A hydraulic brake system as set forth in claim 4, wherein the O-ring engaging surface on the valve base is a surface in an O-ring seal groove.

15. A hydraulic brake system as set forth in claim 4, wherein the discharge passage through said valve cap includes an inner reduced diameter passage that is offset to one side of the axis of said valve cap and an outer enlarged diameter passage that is concentric with the axis of said valve cap.

16. A hydraulic brake system as set forth in claim 15 wherein the inner reduced diameter passage extends from the cap valve surface to the outer enlarged diameter passage at an acute angle to the axis of said valve cap.

17. A brake bleed valve, with corrosion protection, comprising a valve base having an inlet end and an outlet end, saud base having a bleed air passage extending from the inlet end to the outlet end, an outer threaded portion on the outlet end, and a base valve seat on the outlet end;
a valve cap having a bore with a threaded section in threaded engagement with the outer threaded portion on the outlet end of said valve base and advanceable along the outer threaded portion in a first direction to a valve-closed position and in a second opposite direction to a valve-open position, a cap valve surface on said valve cap that closes the bleed air passage in said valve base when said valve cap is in said valve closed position, said valve cap having a discharge passage through the valve cap in communication with said cap valve surface that is closed by the base valve seat of the valve base when the valve is in said closed position; there being a discharge chamber defined by the base valve seat, the cap valve surface and a portion of the said bore in the valve cap when the brake bleed valve is in said open position forming a passageway connecting the bleed air passage with the discharge passage, and said base valve seat and said cap valve surface substantially eliminating said discharge chamber when the valve is in said closed position.

* * * * *

UNITED STATES PATENT AND TRADEMARK OFFICE
CERTIFICATE OF CORRECTION

PATENT NO. : 5,447,214
DATED : September 5, 1995
INVENTOR(S) : Dallas A. Appelgren It is certified that error appears in the above-indentified patent and that said Letters Patent is hereby corrected as shown below:

Column 8, line 18, after "seat" insert -- on --.

Signed and Sealed this

Nineteenth Day of March, 1996

Attest:

BRUCE LEHMAN

Attesting Officer     Commissioner of Patents and Trademarks